United States Patent [19]

Goldin

[11] 4,020,929

[45] May 3, 1977

[54] SHOCK ABSORBER

[76] Inventor: Gerald Goldin, 138 S. Parkview Ave., Columbus, Ohio 43209

[22] Filed: Oct. 28, 1975

[21] Appl. No.: 626,239

[52] U.S. Cl. .............................. 188/321; 74/586; 403/362

[51] Int. Cl.² ....................................... F16D 65/02

[58] Field of Search ............. 188/1 A, 196 M, 321; 74/586; 403/309, 313, 362

[56] References Cited

UNITED STATES PATENTS

| 943,671 | 12/1909 | Flentje | 188/321 X |
|---|---|---|---|
| 949,833 | 2/1910 | Mueller | 188/321 |
| 1,318,591 | 10/1919 | Radlein | 188/196 M UX |
| 1,950,882 | 3/1934 | Gianini | 188/196 M UX |
| 3,197,188 | 7/1965 | Moore | 74/586 X |

*Primary Examiner*—Duane A. Reger
*Attorney, Agent, or Firm*—Jerome P. Bloom

[57] ABSTRACT

The shock absorber illustrated includes a shell one end portion of which is biased from the other, by virtue of contained means, to establish a base length for said shell. Adapter means are provided for connecting the ends of said shell respectively with an overlying structure and a base for said structure. The shock absorber shell and the adapters are characterized by means capable of defining a separable connection therebetween facilitating a quick, precise, relative positioning of the parts, within permissible tolerances, as required to effect one of a plurality of possible extensions of said shell. The separable connector means are so designed as to enable a mechanic to quickly make the apparatus fit any one of a number of applications without need for a trial and error procedure. In the preferred embodiment illustrated the means defining said separable connection provides for a quick visual determination that the parts thereof are properly established in the relative position required for their intended application.

17 Claims, 6 Drawing Figures

U.S. Patent May 3, 1977 Sheet 1 of 2 4,020,929
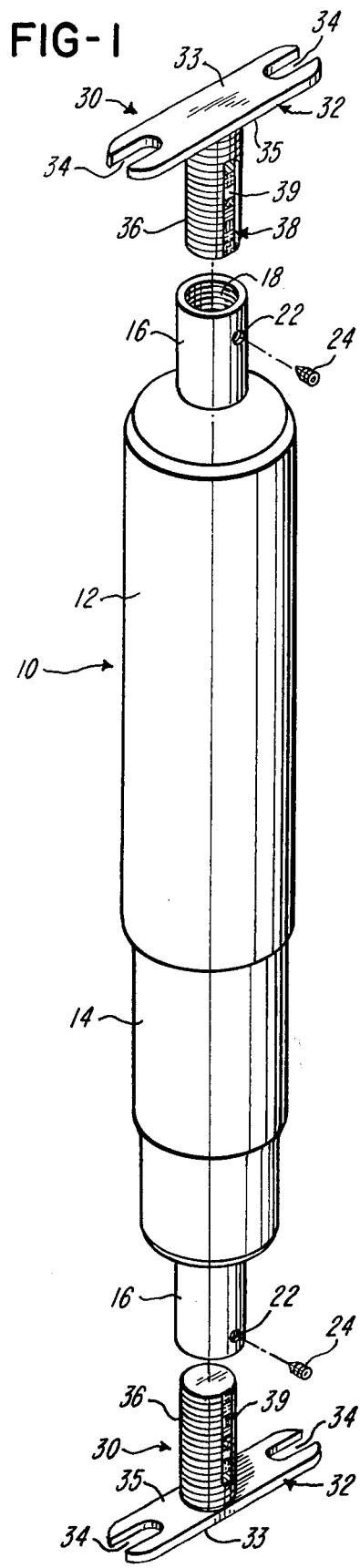
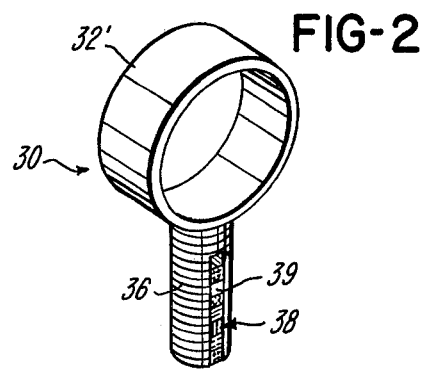
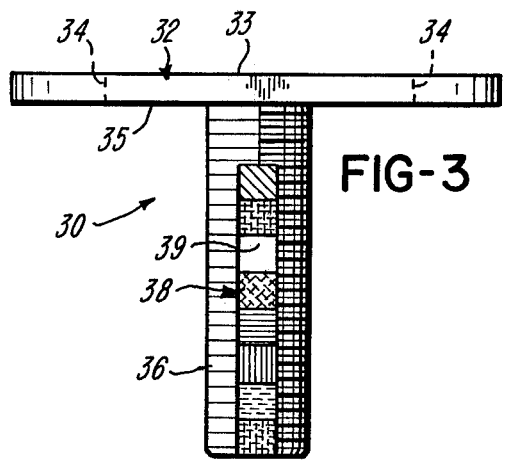
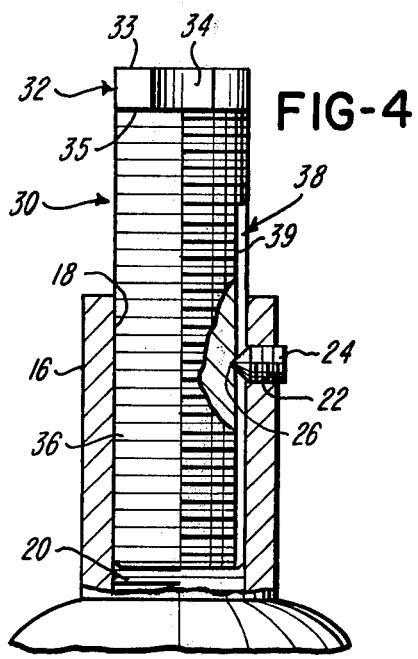

U.S. Patent  May 3, 1977  Sheet 2 of 2  4,020,929
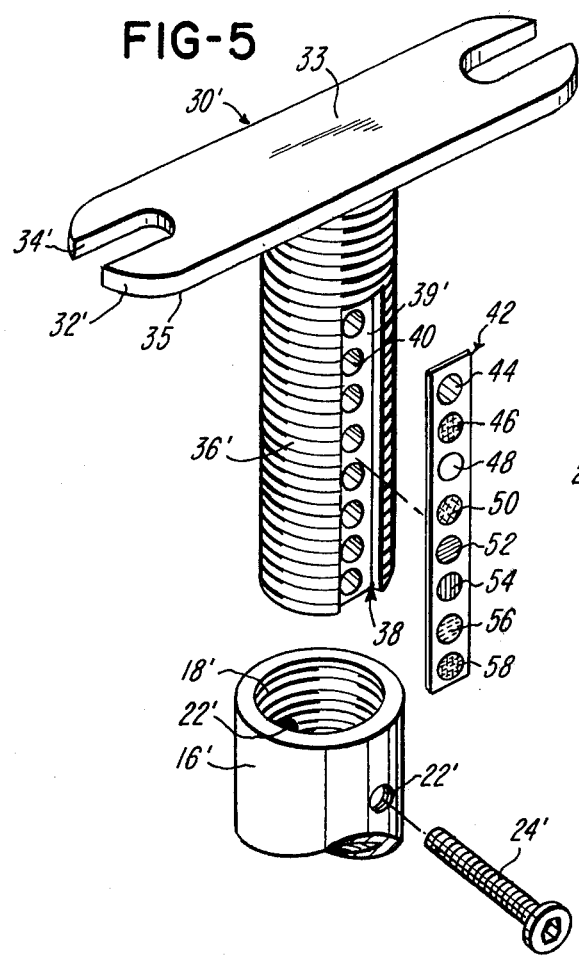
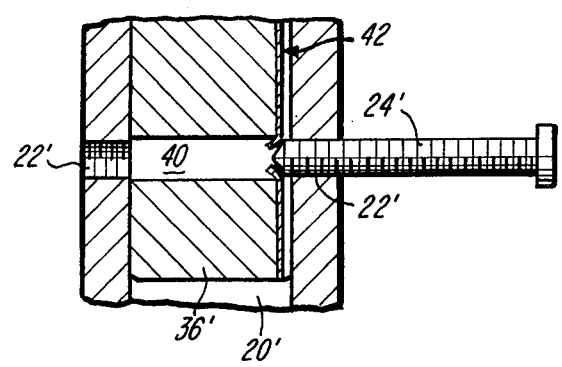

SHOCK ABSORBER

BACKGROUND OF THE INVENTION

This invention relates to improvements in the available means, methods and systems for creating and installing shock absorbers. It has particular advantage in application to those shock absorbers which are used in automotive vehicles and will be so described by way of illustration. It should be obvious, however, that its application is not so limited. Such is not intended.

Due to their ever changing structural design and load characteristics manufacturers of automotive vehicles have custom designed and continue to custom design the shock absorbers required for each vehicle. It will be obvious, under such circumstances, that a replacement for an original equipment shock absorber must of necessity meet the specifications of the original equipment manufacturer. As a consequence, the inventory of different shock absorber units required of each automotive parts supply house and maintenance and repair center has been ever increasing. At this point the variety of units and parts necessary to satisfy customer needs is unbelievably large. The problem in this respect has been compounded by the demand for different types of units variously categorized as standard, heavy duty and air type shock absorbers.

As will be self-evident, the capital investment required for each automotive part supply house or repair center to maintain an adequate inventory of shock absorber units is accordingly substantial and at a level to question its justification. The space requirement for maintaining an adequate inventory is even more burdensome. These factors tend to cause the part supply houses and maintenance and repair centers to limit their inventory of replacement shock absorber units and parts thereof, thereby limiting their capacity to give adequate and prompt attention to the needs of their customers.

There have been some efforts to alleviate the above noted problem. One has produced a concept whereby shock absorbers for automotive vehicles have been made in three parts. As proposed, these parts include a shock absorber body to each of the opposite ends of which is fixedly welded a male fitting which is externally threaded for threaded engagement by various adapter or connector devices. It has been suggested that by use of this prior art structure one may, by appropriate choice of the connector device, adapt a shock absorber body for use in more than one application. While the theory of this concept is good, the execution thereof suggested is not fully satisfactory. By the use thereof inventory may be reduced to a limited extent but not without raising other problems. For example, the structural arrangement provided by the prior art concept does not facilitate the production of a required shock absorber unit without much trial and error. There is really no definitive manner in which one may utilize the concept and accurately arrive at a required installation with any degree of certainty. In addition to this, the embodiment of externally threaded connector means on the shock absorber body or shell per se inherently produces problems in that the exposed threads are readily subject to damage, the undesirable consequences of which in attempting to effect various shock absorber assemblies are obvious.

SUMMARY OF THE INVENTION

The present invention is believed to be an acceptable and most desirable solution to the above described problem and to carry the shock absorber art a definite step forward. It not only recognizes the value of forming a shock absorber unit of separable parts but it does so in a manner to enable any one of a number of different shock absorber assemblies to be quickly and precisely effected, using the same parts, by persons lacking any particular specialized skill or expensive or time consuming training in this respect.

A preferred embodiment of the present invention includes a basic shock absorber body or shell comprised of end portions biased by contained means to provide for such shell a predetermined base length. Integrated with or formed in each of the remote ends of the shell is a female fitting the outwardly projected end of which defines a tubular structure the inner wall surface of which is threaded. Provided for selective connection with each of the female fittings are a series of adapters or connector devices each of which incorporates an identical screw-type, externally threaded projection which may be threadedly engaged in and coupled with the female fitting at either end of the basic shell. Each of the male fittings provided by the threaded projections on the adapter or connector devices is provided with a longitudinally extending groove or keyway, which groove has the length thereof distinguished by successive segments the surface of each of which is distinguished by a different color. The female connector device at each end of the basic shock absorber body or shell is provided with a small radial aperture tapped to have the inner wall thereof threaded. This small bore aperture provides a sighting tube for observing the colors provided in the keyway or groove a mating threadedly engaged male fitting on an associated adapter or connector device. As will be obvious, through such means a mechanic can readily spot when a portion of a groove of a particular color is first aligned with the radial aperture. As will be described, the sighting of a particular color by way of the radial aperture will signal that the adapter or connector device attached to the shell has been brought into a position such that the device provides a specific extension of the shell. Thus, as will be readily apparent, all a mechanic needs to do to arrive at a particular shock absorber assembly to fit a particular application is to threadedly engage the adapter or connector device required at each end of the shock absorber shell in the female fitting described, whereupon an immediate realization of an assembly of required length is had by bringing a particular color of the male fitting in alignment with the radial aperture in each female fitting. Once this is achieved, a special Allen head screw is threadedly engaged in each sighting aperture. This screw has a conically shaped hardened head the apex of which is directed inwardly of the radial aperture to bite into the relatively softer surface of the aligned portion of the keyway in the associated male fitting. As this is done, the related connector or adapter device is fixed to provide a precisely required extension, within permissible tolerances, of the basic shell.

A preferred modification of the above described embodiment of the invention provides that the tubular wall structure of the female fitting at each end of the shock absorber body includes two small radial apertures positioned in a diametrically opposite, axially aligned, relation. The related adapter or connector devices retain the basic configuration above described. However, in this case the male fitting portion thereof is provided by a screw-type stud-like projection which includes a series of longitudinally spaced, transversely oriented, apertures each of which lies on a diameter of the stud and has one end thereof opening from the base of the longitudinally extending groove formed in the side of the stud. Secured in the base of the groove, the length thereof, is a thin film-like strip of material which may be of paper or plastic. This strip incorporates a series of differently colored dots so spaced that when the film strip is properly in place each of the transversely oriented apertures in the associated stud will have the end thereof which opens to the groove bridged by a dot of a particular color. As will be obvious, in using this preferred embodiment of the invention one may screw a male fitting portion of an adapter into a female fitting and in the process have the various dots of color on the male fitting come into alignment, in turn, with one or the other of the radial apertures in the female fitting. The arrangement provides that when an appropriate dot of color is sighted as centered in one of the radial apertures in the female fitting, one can be certain that the applied adapter is appropriately positioned to provide a specific axial extension of the end of the shock absorber body to which it is applied. Accordingly, on observing the appropriate dot of color, as described, an Allen head screw may be then applied in the aperture in which the dot of color is sighted to fix the adapter in its established position. The film-like nature of the strip portion embodying the colored dots is of such a nature that on application thereof the screw will break the aligned dot and pass freely to and through the aperture behind the dot and into the aligned radial aperture in the female fitting which is remote from that in which the appropriate color has been sighted. The radial apertures in the female fitting will of course be tapped. This provides for the threaded engagement thereof by the Allen head screw, one end of which is headed to limit the application thereof so the projected extremity of its opposite end will lie within the limits of the remote wall portion of the female connector device to which it is applied. This structure provides a most positive and precise coupling of each male formed adapter device to the shock absorber body or shell.

The invention recognizes that the essential difference between the many variously designed shock absorbers lies in their basic or static length. With this in mind, it provides a simple adaptation of separable parts enabling them to be put together in a logical manner without need for special tools or knowledge. With the use of the invention one may therefore easily produce from the same parts a greater variety of shock absorber assemblies having different lengths. This obviously results in a substantial reduction of the inventory necessary to produce substitutes for a large number of custom designed shock absorbers. The reduction in inventory enabled by the invention may be as much as 80 percent of that previously required to adequately service customer needs.

It is accordingly a primary object of the invention to provide shock absorber apparatus which is economical to fabricate, more efficient and satisfactory in use, adaptable to a wide variety of applications and unlikely to malfunction.

Another object of the invention is to provide simple means for quickly and precisely effecting a substantial number of replacements for custom designed shock absorber assemblies characterized by means which positively and accurately signal the achievement of a shock absorber assembly of a required length.

A further object of the invention is to provide a means and method for enabling unskilled mechanics to easily and readily build replacements for original equipment shock absorber assemblies.

An additional object of the invention is to provide improved means and methods for substantially reducing the inventory of shock absorber units and parts required to satisfy customer needs.

Another object of the invention is to provide shock absorber assemblies and parts thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein some but not necessarily the only forms of embodiment of the invention are illustrated, FIG. 1 illustrates a basic shock absorber body or shell in accordance with the present invention and in exploded relation thereto the adapter or connector devices which are capable of selective application to the body or shell to achieve any one of a plurality of possible extensions thereof;

FIG. 2 is a perspective view of a further type of connector or adapter device which may be substituted for one or both of the adapter or connector devices shown in FIG. 1;

FIG. 3 of the drawings is an enlarged view of the essential features of an adapter or connector device in accordance with the invention;

FIG. 4 is a sectional view illustrating the manner in which an adapter or connector device is locked to the shock absorber shell in one embodiment of the subject invention; and FIGS. 5 and 6 illustrate a modification of the structure shown in FIGS. 3 and 4 enabling a preferred embodiment of the present invention.

Like parts are indicated by similar characters of reference throughout the several views.

It is to be understood that only so much of a shock absorber assembly is here described and illustrated as may be necessary for an understanding of the present invention.

The invention provides a modification of a conventional shock absorber unit to produce a body or shell having a predetermined length the ends of which are per se formed to receive and accommodate various separate adapters or connector devices. The latter are uniquely designed to include means enabling that they may be precisely and optionally set in any one of a plurality of defined positions referenced to connector means integrated to either end of the basic shell.

FIGS. 1-4 of the drawings exemplify one embodiment of the present invention.

In this embodiment shown a shock absorber body 10 per se includes a pair of cup-shaped elements 12 and 14. The open ends of the elements 12 and 14 are telescopically related to form an elongate generally cylindrical shell-like housing. This housing contains suitable means for biasing the cup-shaped elements to normally cause the body to have a predetermined basic or static length. Since the details of the biasing means, which may, for example, comprise spring means or air under pressure, and/or the application thereof to achieve a body 10 having a predetermined static length are not essential to an understanding of the present invention, and may be achieved by any conventional means, such details are neither shown nor here described. Suffice it to say that the cup-shaped elements 12 and 14 are interrelated with their biasing means so the length of the shock absorber body defined thereby may be extended or reduced under the influence of an applied load. Conventional means are provided to inhibit a complete separation of the shell portions 12 and 14.

In accordance with the invention, the remote ends of the body 10, defined at the respective base portions of the cup-shaped elements 12 and 14, each embody, at their centers, a tubular, integrated, axially projected wall structure 16. The inner surface portion 18 of the tubular wall structure 16 at each end of the body 10 is threaded and bounds a cavity or passage 20 which is directed axially and inwardly of the shock absorber body. The one end portion of each tubular wall structure 16 which projects outwardly from the basic shock absorber body includes a small bore radial aperture 22 which has been tapped to accommodate an Allen head set screw 24. The screw 24 is in this instance characterized by a conically configured, hardened, leading end portion 26 the apex point of which defines its projected extremity. The purpose of this will be further described.

The invention contemplates, for use with the basic body 10, the availability of various adapters or connector devices which are separate elements. Each of the separate elements will have one end portion designed to mount or seat on and be connected to either a superposed structure which is to be resiliently supported by the shock absorber or an underlying structure which forms its base. This mounting or seating portion of the adapters or connector devices may be conventionally configured to suit the particular structures to which they apply. In the case of the adapter device 30 shown in FIG. 1 of the accompanying drawings, the mounting or seating portion 32 thereof is shown to have a narrow elongate plate form, the respective ends of which each include an inwardly directed notch 34. The notches 34 accommodate the application of conventional connector devices such as bolts to secure the plate portion 32 so as to position its outermost face 33 in abutment with either an overlying or underlying structure, as the case might require, in a manner believed obvious. Connected with the opposite or innermost face 35 of the plate structure 32, at its center, is a perpendicularly projected male fitting which is adapted to be threadedly engaged in a female fitting defined by the tubular wall structure 16 at either end of the body 10. The male fitting 36 which is connected so as to be integral with the plate 32 has a body portion which is generally cylindrically shaped and externally threaded. Cut into the external surface of the body 36 and opening at one end from the projected extremity of the body 36 is a longitudinally extending groove or keyway 38 which is rectangular in cross section. The base surface 39 of the keyway 38 is distinguished by successive longitudinally extending segments having applied thereto a different color. This provides, in the case illustrated, eight small rectangular surface portions of the keyway or groove base 39 each of which is distinguished by a distinctive color, one differing from the other. It will be seen, by way of illustration and not by way of limitation that the various colors may include blue, yellow, green, orange, red, white, gold, and silver. As will be obvious, upon applying the male fitting 36 in a female fitting constituted by a tubular wall structure 16 at one end of the body 10 and turning the adapter device incorporating the male fitting 36 into the female fitting the colors provided on the base 39 of the groove or keyway 38 will in the course of such turning successively appear in alignment with the radial aperture 22 in the female fitting. Each different color will signal a different relative projection of the outermost surface 33 of the plate 32 with reference to the adjacent end of the body 10. As will be seen, such means enable one to easily achieve a foolproof method of charting selective extensions at either end of the body 10, on the application to a female fitting 16 of an adapter device of the nature and as described. By utilization of the improvements of the invention as here set forth trial and error procedure is eliminated. All one needs to know is the significance of the signalling of the different colors as sighted through the aperture 22 in order to know that an adapter device has been applied at either end of the body 10 so as to create an assembly having a required and predetermined axial length.

It will be seen therefore that it requires no special skill or talent to utilize one pair of adapters 30 with a basic body 10 modified in accordance with the invention and achieve a large number of different shock absorber assemblies each of which is capable of substitution for a particular custom designed unit. It should be kept in mind that the basic consideration is to obtain an assembly the length of which is precisely as designed into the original equipment which the shock absorber assembly is to replace.

Of course, there will be different shock absorber bodies 10 with differences in the nature and character of the biasing means so as to achieve for the basic unit a categorization of the same as a standard, heavy duty or air type unit.

Depending upon the automotive vehicle construction, there are approximately nine types of configurations desirable for the seating or mounting portion 32 of the adapter device 30. FIG. 2 of the drawings shows such seating or mounting portion, identified as 32', as having a ring shape for example. There may be other configurations, however these need not be specifically shown or described since their design is well known and within the capabilities of persons versed in the shock absorber art and they do not, per se, form a definitive part of the present invention.

Once adapter devices 30 are applied to the female fittings defined by the tubular wall structure 16 to either end of the body 10 so the appropriate colors, as required to provide a shock absorber assembly having a particular length, are sighted through the apertures 22 in the female fittings, then one may quickly and easily apply in each of the apertures 22 a set screw 24 to have the hardened leading end thereof bite into the relatively softer material forming the base 39 in the keyway 38 whereupon the respective adapter devices are locked in place. When this occurs, one has in a minimum time and with a minimum of effort produced a shock absorber assembly the length of which will precisely fit the required application, within permissible tolerances.

It will of course be obvious that in utilizing the apparatus of the invention that charts may be readily set up to serve as a guide through the medium of which a mechanic may select, for a particular application, a designated standard, heavy duty or air type shock absorber unit or body 10 together with a pair of adapter devices the mounting or seating portions of which are suitable to the structure to which they are to apply. Once this is done the mechanic can refer to the chart to determine the color which is to appear in line with each of the sighting apertures 22 as the respective adapter devices are applied to the female fittings defined by the tubular wall structures 16 at the respective ends of the basic unit 10. Thus, nothing will be left to chance. Nor will the mechanic be subjected to a requirement for a trial and error procedure in efforts to meet the requirements of a particular application. In any case, having available no more than about 34 parts, as contrasted to 300 as heretofore required, one can achieve substitutes for any one of the multitude of custom designed original equipment shock absorbers, replacements of which are necessary to satisfy customers needs. Particular attention is directed to the fact that not only is the invention capable of substantially reducing the requirements for inventory as well as substantially reducing capital investment necessary to satisfy all customer needs, but one also substantially reduces the time and effort needed for installing replacement shock absorbers in a precisely fashioned and optimal condition.

FIGS. 5 and 6 of the drawings illustrate a particularly preferred embodiment of the invention which constitutes a modification of the structure shown in the FIGS. 1 through 4. In this embodiment parts thereof which are like those of the embodiment of FIGS. 1 through 4 are identified by like numerals to which are applied "prime" symbols. Thus, FIG. 5 illustrates an adapter device 30' having an outline generally identical with that of the device 30 shown in FIG. 3. The device 30', however, differs in two respects. The perpendicularly projected screw formed, stud-like, male fitting portion 36' is provided with a series of longitudinally spaced, transversely oriented, apertures 40. Each of the apertures 40 lies on a diameter of the stud-like male fitting 36' and has one end thereof opening from the base 39' of the longitudinally extending groove 38' formed in the side of the stud-like fitting 36'. The second difference in the case of the adapter 30' is that there is secured over the base of the groove 39', the length thereof, a thin film-like strip 42 of material which may be of paper or plastic. The strip 42 is designed to incorporate a series of dots 44, 46, 48, 50, 52, 54, 56 and 58 each of which has a different color. These colored dots are so spaced that when the film strip 42 is properly in place on the base 39' of groove 38', each of the transversely oriented apertures 40 will have the end thereof which opens through the groove base 39' bridged by a dot of a particular color, in coaxial alignment therewith. In the example illustrated in FIG. 5, as in the case of the adapter device 30, the male fitting portion 36' has an integral connection with and projects perpendicularly from the center of the face 35' of the mounting or seating plate-like portion 32' of the adapter. The mounting or seating portion 32' is in this instance identical in configuration to that of the mounting or seating portion 32 of the adapter 30 since it has a narrow elongate plate form and respective ends which each include an inwardly directed notch 34'.

In this preferred modification of the invention each of the respective ends of the shock absorber body or shell 10 will have in connection therewith a tubular wall structure forming a female fitting 16'. As in the case of the fitting 16 in the embodiment first described, the fitting 16' is formed centrally of the end of the shock absorber body to which it is integrated and its central axis is coaxial with the central axis of the shock absorber body per se. The tubular wall structure 16' defining a female fitting in this case is identical with that of the fitting 16 except that it includes two axially aligned, diametrically opposite, small bore radial apertures 22' rather than one aperture 22. Each of the apertures 22 is tapped so they may mutually receive and be threadedly engaged by a screw 24' which is so designed that in the application thereof it will bridge a diameter of the fitting 16'.

As will be obvious from FIGS. 5 and 6 of the drawings, in using the structure of this preferred modified embodiment of the invention one may screw the male fitting portion 36' of the adapter 30' into a female fitting 16' and in the process have the various dots of color on the strip 42 embodied in the male fitting come into alignment, in turn, with one or the other of the radial apertures 22' in the female fitting. From appropriate charts such as previously described, a mechanic in application of the adapter 30' will know what color he should sight through an aperture 22' in the female fitting in order to be certain that the adapter 30' will be so positioned to define the required extension of the end of the shock absorber body to which it is applied. Thus, when an appropriate dot of color is sighted as centered in one of the radial apertures 22' in the female fitting 16', the mechanic can be certain the adapter 30' is appropriately and precisely positioned, as required. At this point the mechanic can then apply the screw 24' to fix the position of the adapter 30' relative the female fitting 16' to which it has been applied. As will be obvious, the screw 24' is an Allen head screw which is applied through the radial aperture 22' in the female fitting in which the appropriate color has been sighted. Since the film form of the strip 42 is so designed, on threading the screw 24' into the female fitting the leading end thereof will break the aligned dot of color and pass freely to and through the aligned aperture 40 the position of which is properly effected by the sighting of the dot of color in the aperture 22'. In this embodiment of the invention, since in the application thereof the screw 24' completely bridges the female fitting 16' and passes through the body of the stud-like male fitting 36', one achieves a most positive interengagement of the adapter 30' to the fitting to which it is applied. Not only is the coupling positive but the proper alignment of the adapter 30' with reference to the shock absorber body is insured, within permissible tolerances.

Of course, screw 24' is headed at one end thereof to limit the application of the body of the screw so its projected extremity will fall within the limits of the radial aperture 22' remote from the head of the screw.

It is believed that the foregoing will make adequately clear that by reason of the simple concepts of the present invention one may provide a minimum of apparatus through the medium of which a large number of substitutes for original equipment shock absorbers can be achieved by persons having no more than the simplest of mechanical capabilities and visual perception.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Shock absorber apparatus comprising a shell opposite ends of which are biased from each other to form a shock absorber body having a predetermined static length, adapter means including means for effecting a connection thereof to an underlying base structure or to an overlying structure to be supported by said body, means for linking said adapter means to an end of said shell, to form an extension thereof, said linking means comprising interfitting means including one of female form defined by a tubular wall structure which is internally threaded and centered in respect to an end of said shell to which it connects and one of male form, embodying signal means, which on application inwardly of said tubular wall structure will signal successive stations thereof each of which provides a setting to which said tubular wall structure may be referenced to achieve a selected one of a plurality of set positions of said adapter means which produces a predeterminable extension of said shell, said signal means being embodied in a groove formed in and extending in a sense longitudinally of the male of said interfitting means and said female of said interfitting means having means to selectively align with said signal means provided on said male thereof and means utilizable to fix said male thereof with reference thereto when the alignment required is achieved.

2. Shock absorber apparatus as in claim 1 characterized in that said signal means at said successive stations includes color coded means.

3. Shock absorber apparatus comprising a shell opposite ends of which are biased from each other to form a shock absorber body having a predetermined static length, adapter means including means for effecting a connection thereof to an underlying base structure or to an overlying structure to be supported by said body, means for linking said adapter means to an end of said shell, to form an extension thereof, said linking means comprising interfitting means one of which has a male form and a second of which has a female form and includes diametrically spaced, axially aigned apertures, said interfitting means of male form embodying signal means each of which provides a setting to which one of said apertures may be referenced to achieve a selected one of a plutality of set positions of said adapter means with reference to said shell, to provide thereby a predeterminable extension of said shell, said interfitting means of male from having longitudinally spaced, transversely oriented, apertures, one end of each of which is capped by one of said signal means, the sighting of which through one of said apertures in said interfitting means which has a female form establishes that said adapter means has achieved a selected extension of one end of said shock absorber body, and means for application through said one of said apertures in said female of said interfitting means, the signal means sighted therethrough and the transversely oriented aperture in said interfitting means of male form capped by the sighted signal means to effect a positive coupling of said interfitting means and maintain said extension of said shock absorber body which has been effected through the medium of the application of said adapter means.

4. Shock absorber apparatus as in claim 3 characterized in that the male of said interfitting means has a longitudinally extending groove to which one end of each of said transversely oriented apertures opens and a strip of film-like material is applied to the base of the groove in capping relation to the said one end of each of said transversely oriented apertures, which film-like material embodies said signal means in the respective areas thereof which cap said apertures, said signal means being in the form of colored dots each one of which is of a distinctively different color whereby to provide for the differentiation of said stations.

5. Shock absorber apparatus comprising a shell opposite ends of which are biased from each other to form a shock absorber body having a predetermined static length, adapter means including means for effecting a connection thereof to an underlying base structure or to an overlying structure to be supported by said body, means for linking said adapter means to an end of said shell, to form an extension thereof, said linking means comprising cooperating means one of which is centered in respect to an end of said shell and in connection therewith, and another of which is connected with said adapter means, signal means on one of said cooperating means defining a series of distinguishable stations each of which provides a setting to which the other of said cooperating means may be referenced to achieve thereby a selected one of a plurality of possible set positions of said cooperating means which produces a predeterminable extension of said shell, and means utilizable to fix and maintain said cooperating means in the positions in which they are set.

6. Shock absorber apparatus as in claim 5 wherein said cooperating means includes telescoping parts one of which physically embodies said signal means which define a plurality of stations, one of which is distinguished from the other, to one of which a second of said parts may be selectively indexed to directly achieve thereby one of said plurality of set positions forming an extension of one end of said shock absorber body.

7. Shock absorber apparatus as in claim 5 characterized in that said cooperating means are provided by means on said shell and said adapter means which interfit and include on one thereof a plurality of differentiated surface portions defining said stations the disposition of which with reference to the other will determine per se the achievement of a selected one of a plurality of set positions of said adapter means to provide thereby a predeterminable extension of said adapter means with reference to said shell.

8. Shock absorber apparatus as in claim 7 characterized in that said surface portions are differentiated by a color code.

9. Shock absorber apparatus as in claim 5 wherein said cooperating means comprise interfitting parts respectively of male and female form.

10. Shock absorber apparatus as in claim 9 wherein said interfitting parts respectively of male and female form are provided to each of the opposite ends of said shock absorber body.

11. Shock absorber apparatus as in claim 5 wherein said cooperating means include cooperating parts a first of which is connected at one end of said shock absorber body to form part thereof, and a second of which, in in connection with said adapter means, includes an element having a telescopic relation to said first part, and one of said first and second parts includes thereon the said signal means which define said stations.

12. Shock absorber apparatus as in claim 11 wherein said second part has a stud-like form and embodies said signal means thereon, at a plurality of spaced locations.

13. Shock absorber apparatus as in claim 12 wherein said signal means are visually distinguishable.

14. Shock absorber apparatus according to claim 13 wherein said visually distinguishable signal means are embodied as markings in a strip of rupturable material, each of which markings is in capping relation to one end of an opening provided in the body of said stud.

15. Shock absorber apparatus as in claim 14 characterized in that said fixing means include a screw thrust through a marking defining one of said stations and into an opening in the body of the stud thereunder.

16. Shock absorber apparatus according to claim 15 characterized by said stud having a groove of longitudinal extent in the outer surface thereof and said strip of rupturable material applied in said groove.

17. Shock absorber apparatus as in claim 5 characterized in that said cooperating means comprise interfitting means one of which has a male form and the other of which has a female form and includes diametrically spaced axially aligned radial apertures, said interfitting means of male form including longitudinally spaced, transversely oriented apertures one end of each of which is capped by one of said signal means the sighting of which through one of said radial apertures establishes that said cooperating means have, in the relative positions to which they have then been set, achieved a selected extension of one end of said shock absorber body, said cooperating means being fixed in the positions to which they are set by application of connecting means through the aperture through which the signal means for producing a predeterminable extension of said shock absorber body has been sighted.

* * * * *

UNITED STATES PATENT AND TRADEMARK OFFICE
CERTIFICATE OF CORRECTION

PATENT NO. : 4,020,929

DATED : May 3, 1977

INVENTOR(S) : Gerald Goldin

It is certified that error appears in the above-identified patent and that said Letters Patent are hereby corrected as shown below:

Col. 2, line 37, -- of -- is inserted following "groove".

Col. 9, line 60, "aigned" is corrected to read -- aligned --;

line 67, "from" is corrected to read -- form --.

Signed and Sealed this thirtieth Day of August 1977

[SEAL]

Attest:

RUTH C. MASON
*Attesting Officer*

C. MARSHALL DANN
*Commissioner of Patents and Trademarks*